United States Patent [19]
Redd

[11] 3,969,183
[45] July 13, 1976

[54] VACUUM DEHYDRATION OF HEAT SENSITIVE MATERIALS

[75] Inventor: James B. Redd, Clearwater, Fla.

[73] Assignee: A. E. Staley Manufacturing Company, Decatur, Ill.

[22] Filed: Oct. 4, 1974

[21] Appl. No.: 512,631

[52] U.S. Cl. ............................ 159/49; 159/11 R; 159/12; 118/262; 426/471
[51] Int. Cl.² ............................................ B01D 1/22
[58] Field of Search ........ 159/7, 11, 12, 49, DIG. 6, 159/43, 8, 10; 34/117; 426/472, 471; 118/262

[56] References Cited
UNITED STATES PATENTS

| | | | |
|---|---|---|---|
| 1,608,147 | 11/1926 | Vierling | 159/DIG. 23 |
| 1,810,691 | 6/1931 | Van Marie | 159/DIG. 23 |
| 2,119,594 | 6/1938 | McLean | 159/7 |
| 2,825,653 | 3/1958 | Dorsey et al. | 159/49 |
| 2,924,272 | 2/1960 | Conley et al. | 159/12 |
| 2,924,273 | 2/1960 | Conley et al. | 159/12 |
| 3,085,018 | 4/1963 | Viall et al. | 159/11 |
| 3,241,981 | 3/1966 | Strashun et al. | 159/49 |
| 3,414,982 | 12/1968 | Oas | 159/10 X |
| 3,417,483 | 12/1968 | Willard | 34/117 |
| 3,418,142 | 12/1968 | Willard | 34/117 X |

Primary Examiner—Norman Yudkoff
Assistant Examiner—J. Sofer
Attorney, Agent, or Firm—Howard J. Barnett; Charles J. Meyerson

[57] ABSTRACT

A method and apparatus for vacuum dehydrating heat sensitive liquid material, particularly fruit juices including citrus and tomato juices. A top loading, endless belt conveyor for the thin liquid film is disposed in a vacuum dehydrator chamber which is maintained at about 2 mm. Hg. The belt travels through a cooling zone and a heating zone to attain substantially complete dehydration of the thin film. The liquid material is continuously applied to the upper side of the belt in the cooling zone by means of an applicator system comprising a grooved metering roll and a counter-rotating applicator roll which continuously deposits a uniform film of about 0.005 to 0.05 inches thickness on the endless belt. Dry product at about 0.5–2.5% moisture is removed from the belt in the cooling zone by means of a doctor blade which scrapes the product from the endless belt just prior to the portion of the cooling zone where the applicator system feeds additional liquid material onto the belt. The dehydrated material falls into a hopper and is transferred out of the vacuum dehydration chamber through a vacuum lock outlet.

9 Claims, 3 Drawing Figures

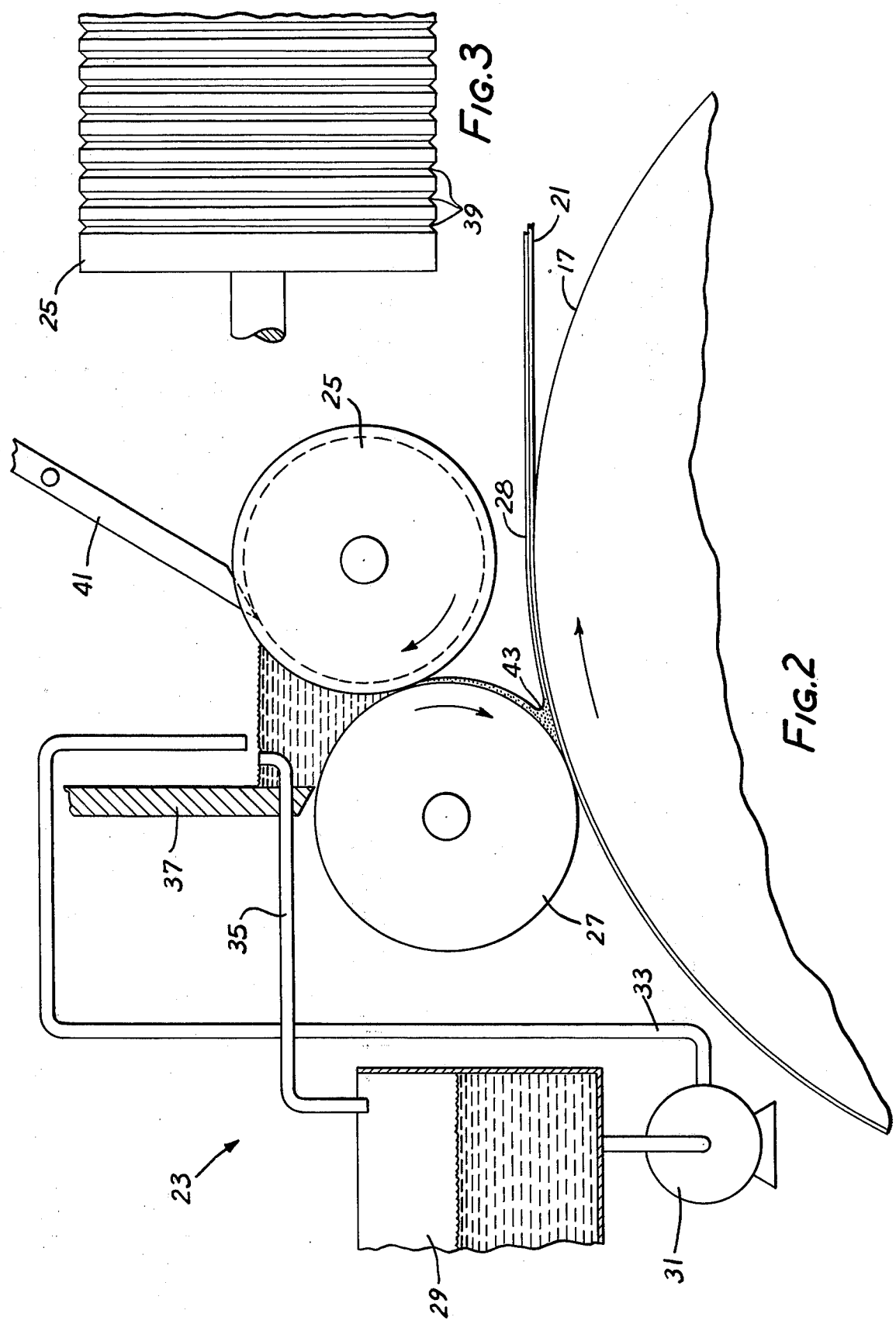

VACUUM DEHYDRATION OF HEAT SENSITIVE MATERIALS

The present invention relates generally to a method and apparatus for dehydrating heat sensitive materials. More particularly, the present invention relates to an improved method and improved continuously operating thin film, vacuum dehydrating appartus for dehydrating heat sensitive liquid materials, such as fruit juice.

It is known to dehydrate heat sensitive liquid materials from a thin film in a vacuum. One such known apparatus and method is described in U.S. Pat. No. 3,085,018 to Viall et al. issued Apr. 9, 1963. In accordance with the Viall, et al patent it is taught that it is desirable to dehydrate the heat sensitive material by heating gradually during an initial stage of drying; then more rapidly during the principal drying operation to effect dehydration as quickly as possible during the principal drying operation which occurs when the thin film of liquid material passes over a drying drum, and finally to finish the dehydration at a reduced rate to prevent damage to the nearly dry material during the final stages of drying. In accordance with the Viall, et al patent and previously known drying methods, it is taught that the drying heat is utilized to the best advantage when the wet material to be dried is preconditioned by preheating it at a reduced temperature prior to the principal drying step. The preheating at a reduced temperature removes easily extracted initial evaporated moisture gradually. It has been thought to be important to remove only a minor amount of the moisture gradually during this preheating treatment step to prevent boiling or spattering and to maintain the material in a highly expanded or puffed condition. The puffed condition of the heat sensitive material undergoing drying was believed to be best suited to adapt the material to withstand the higher uniform principal drying temperature as the material passes over the drying drum. During the principal drying of the heat sensitive material in accordance with the Viall et al. patent, the principal drying step is accomplished at the highest temperature that is feasible in effecting the major drying action whereby most of the moisture is removed in the shortest period of time.

Several problems have occurred in utilizing known thin film vacuum dehydrating apparatus, such as described in the Viall et al. patent. As described in the Viall et al patent, the liquid material to be dried is fed onto a feeding roller which is positioned beneath a continuous drying belt. A backup roll is located on the opposite side of the belt to provide suitable clearance between the belt and the feed roll. The feed roll is rotated by power at a predetermined speed in a manner to apply a thin film of material to the bottom surface of the drying belt. One difficulty that occurs with this feeding machanism is that the liquid material to be dried is usually a concentrate. The concentrate tends to evaporate in the feed reservoir and eventually becomes so viscous that feeding of the feed roller is irregular, and irregularities in the thin film applied to the drying drum occur. Also, the clearance between the backup roll located on the opposite side of the drying belt from the feed roll is critical and is usually maintained within a close tolerance. Maintaining an accurate tolerance across a wide drying belt is extremely difficult. The amount of liquid material that sticks to the belt is determined by both viscosity and concentration. Temperature variations in the drying belt affect the viscosity of the product which is fed to the drying belt so that feeding a uniform layer is extremely difficult. The layer of liquid material to be dried which is applied to the belt by this feeding system generally varies from 3 to 7 thousandths of an inch thick and such variation may occur during a single revolution of the drying belt. Further, heat transfer between the drying belt and the heating drum, where the principal drying effect occurs, is particularly dependent upon the clearance between the drying belt and the heating drum. Heat transfer is usually totally dependent upon contact and radiation is generally not a factor. Even a small clearance between the drying belt and the heating drum and cooling drum effectively prevents heat transfer. To overcome this problem, high pressure is used to force the drying belt to contact the heating drum. Such high pressure alleviates the heat transfer problem but shortens the useful life of the drying belt and the heating drum.

With the known bottom feeding arrangement, the radiant energy applied above the belt and below the belt was interrelated and needed to be exact. If too much radiant energy was applied below the belt, the thin film of liquid feed material was overheated and it dripped off. If too much radiant heat is applied above and through the belt, the product also became overheated and was lost due to boiling and spattering. Further, if the heating drum, where the principal dehydration heat transfer occurred, was too hot, the partially dried product tended to flake off the drying belt in a sheet.

The present invention provides an improved method and apparatus for dehydrating heat sensitive liquids, such as fruit juices, in a vacuum dehydrating apparatus of the heated continuous belt type on a continuous basis. A thin film of the liquid material to be dried is applied to the uppermost surface of the continuous belt, and is thereafter subjected to substantial initial drying prior to undergoing final drying at elevated temperatures.

FIG. 2 is an enlarged detailed view showing the feeding mechanism of the dehydrator appartus of the invention and;

FIG. 3 is an end view of the metering roll of the feeding mechanism of FIG. 2.

Figure 1:
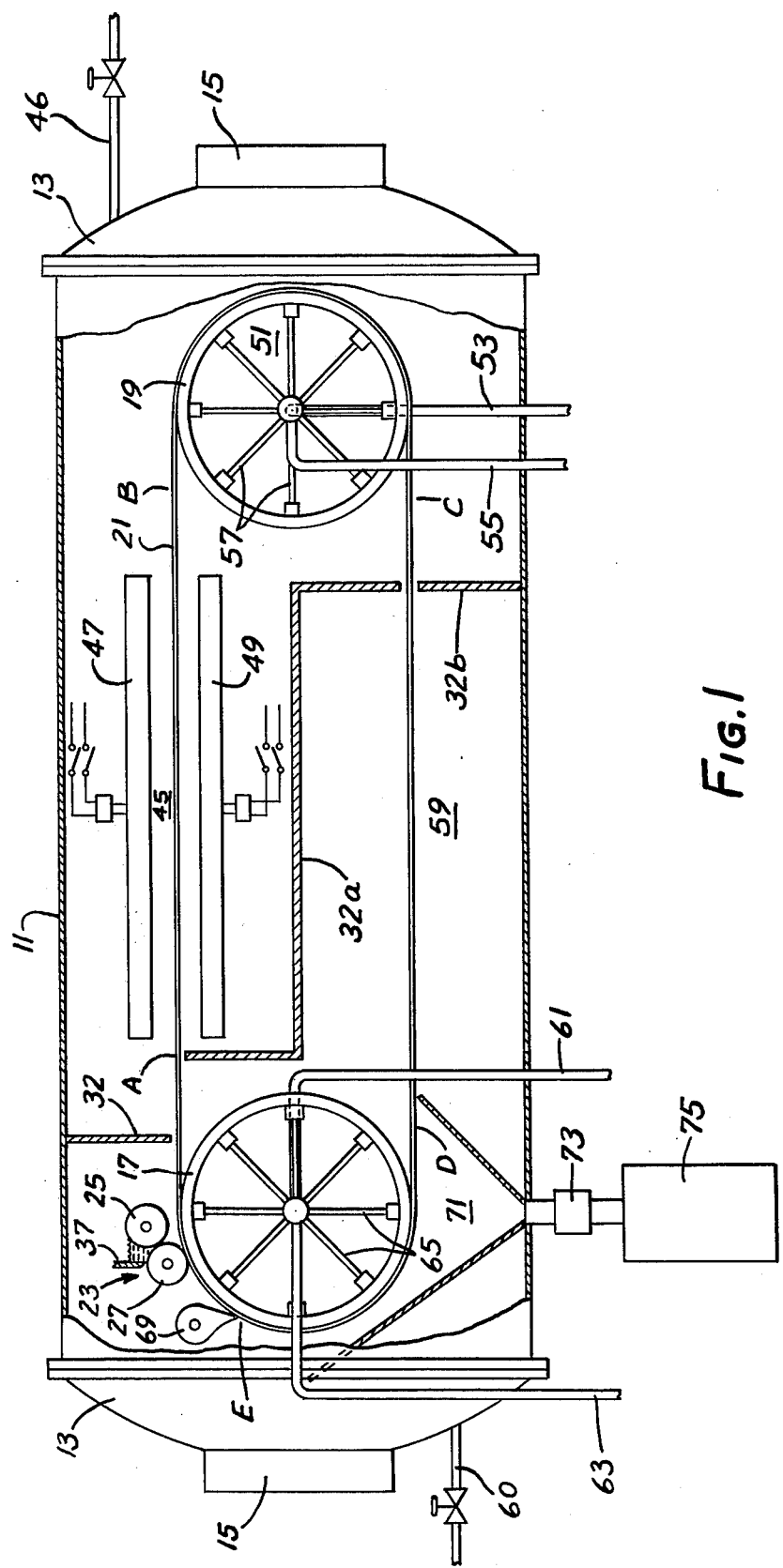
FIG. 1 is a schematic diagram of an improved thin film vacuum dehydration apparatus embodying features of the present invention, said apparatus being shown in diagrammatic, vertical longitudinal section.

Generally, the apparatus of the invention includes a continuous belt which passes over a heating drum and a cooling drum. A thin film of concentrated liquid material to be dried is applied to the uppermost surface of the continuous belt at the end nearest the cooling drum. As the thin film of liquid material is conveyed from the cooling drum to the heating drum, it is subjected to radiant heat transfer from above and below the continuous belt and a substantial proportion of the water in the film is removed prior to its passage around the heating drum. Because of this substantial predehydration, the temperature of the heating drum may be maintained at a relatively low level and still attain substantially complete dehydration of the thin film. The latent heat remaining in the continuous belt after it traverses the heating drum is sufficient to complete the dehydration process. The dehydrated thin film is then conveyed over the cooling drum and the cooled film is removed from the continuous belt by means of a doctor blade.

This invention provides improved apparatus suitable for the application of a thin liquid film of controlled thickness on the uppermost surface of the continuous belt. Because the thin liquid film is applied to the uppermost belt surface, any spattering which may occur due to rapid dehydration of the thin film prior to reaching the heating drum is not detrimental to total drying of the thin film.

Initial heating of the thin film is effected by radiant heaters mounted both above and below the continuous belt and is controlled so that more heat is supplied by the radiant heaters located above the continuous belt. By this arrangement, little energy is lost in effecting heating of the continuous belt and a greater proportion of energy is utilized to effect dehydration of the thin film.

As can be seen in the schematic diagram in FIG. 1, the apparatus comprises a large cylindrical, airtight housing 11 that is closed at its ends to constitute a vacuum chamber enclosing the continuous belt dehydrating apparatus. The housing 11 includes headers 13 at each end of the cylinder to facilitate installation and removal of the dehydrating apparatus. Each header includes a manhole 15 for access to the apparatus for servicing. The dehydrating apparatus enclosed within the housing 11 includes a cooling drum 17, a heating drum 19, and a continuous belt 21 which traverses over the heating and cooling drums and is alternately heated and cooled as it traverses over the two drums.

The belt 21 is a continuous band of relatively thin metal, such as stainless steel, that is maintained under suitable tension and is caused to track by suitable tensioning and tracking apparatus (not shown) carried by an interconnecting frame (not shown). The supporting and tracking apparatus and other operating mechanism of the continuous belt and drum arrangement are well known and are not further described herein.

The liquid material to be dried is applied as a thin film 28 on the uppermost surface of the continuous belt 21 by means of liquid applicator assembly 23. An enlarged view of the liquid applicator assembly 23 is set forth in FIG. 2. As shown in FIG. 2, the liquid applicator assembly 23 includes a metering roll 25 and an applicator roll 27 disposed directly over the cooling drum 17 adjacent the belt 21. Liquid material to be dried is fed from reservoir 29 by means of pump 31 through conduit 33. An overflow pipe 35 is used to return liquid material back to the reservoir 29. The pump 31 feeds the liquid material at a rate slightly in excess of the rate at which the liquid material is applied to the belt 21. The overflow pipe 35 returns any excess liquid material back to reservoir 29. A dam 37 is disposed above the applicator roll 27 and adjacent the metering roll 25. The dam 37 has a middle portion and sides (not shown) closely conforming to the contiguous surfaces of the metering roll 25 and the applicator roll 27 to define therewith a liquid feed chamber, from which the liquid material is dispensed onto the belt 21. By this arrangement, a constant head of liquid material is maintained in the chamber.

As best seen in FIG. 3, the metering roll 25 is provided with a series of grooves 39 for application of a series of stripes of liquid material to applicator roll 27. Metering roll 25 and applicator roll 27 are driven by separate drive means (not shown). Applicator roll 27 is driven in a direction counter to the direction of the cooling drum 17. Metering roll 25 is driven in a direction counter to the direction of applicator roll 27 and in the same direction as cooling drum 17. A series of scrapers 41 are provided for each groove of metering roll 25 to maintain the grooves 39 of metering roll 25 free of any buildup of liquid material.

The grooves 39 are V-shaped and have a depth of from about .19 to about .23 inches and a width of from about .19 to about .23 inches. At present, a depth and width of 3/16(.20) inches is preferred for grooves 39, with the groove centers spaced from each other a distance of from about .35 to about .45 inches.

In operation, as the metering roll 25 moves through the pool of liquid material to be dried, it transfers a series of stripes of the liquid material to the applicator roll 27. As the speed of the metering roll 25 is increased, the amount of material applied to the applicator roll 27 is decreased and the thin film of material applied to the continuous belt 21 is reduced in depth. The applicator roll 27 transfers the liquid material applied to the applicator roll 27 by the metering roll 25 to the continuous belt 21. The speed of the applicator 27 is adjusted to maintain a slight buildup 43 of liquid material at the nip between the applicator roll 27 and the continuous belt 21. The speed of both the metering roll 25 and the applicator roll 27 is adjustable within the range of from about 0.5 to about 2 rpm. It is preferred that slight differential be maintained between the speed of revolution of the metering roll and the applicator roll so that a scrubbing or wiping effect is attained. The stripes of liquid material applied to the applicator roll 27 by the metering roll 25 even out as they pass from the point of application to the nip. Because of the close contact and the difference in direction of rotation between the applicator roll 27 and the continuous belt 21 all of the liquid material is wiped from the applicator roll 27 onto the belt 21 to provide a thin film 28 of liquid material on the belt 21. The metering roll 25 and the applicator roll 27 are maintained in contact by spring tension (not shown) and the applicator roll 27 is maintained in contact with the continuous belt 21 by spring tension (not shown).

The liquid applicator assembly 23 of the invention is suitable to apply very even thin films having a thickness in the range of about 0.005 inches to 0.05 inches. Optimum operation of the dehydrating apparatus is attained when the thin film 28 is applied in the range of about 0.02 inches to about 0.025 inches.

Applicator roll 27 is preferably constructed of a material with lubricating properties, such as polytetrafluoroethylene, polyethylene, polyurethane, polypropylene and similar plastic materials. The metering roll 25 may be constructed of any suitable metallic or plastic material and is preferably constructed of stainless steel for ease in maintenance and cleaning.

Baffles 32, 32a, and 32b are used to isolate the liquid applicator assembly 23 from the heating drum 19 and the radiant heaters 47 and 49. This prevents any substantial evaporation and concentration of the liquid material from occurring.

In the drying operation, the thin film 28 of liquid material is first carried through a primary dehydration zone 45 which extends between points marked A and B in FIG. 1. A vacuum is maintained within the housing 11 through a vacuum conduit 46 by suitable means (not shown) such as a vacuum pump or steam jet ejector. In primary dehydration zone 45, radiant heaters 47 are located above the thin film 28, and radiant heaters 49 are located beneath the belt 21. It is an important feature of the present invention that at least 50 percent and up to about 90 percent of the total moisture to be removed from the thin film 28 of liquid material is removed in primary dehydration zone 45. Since some liquid remains in the thin film 28 during passage through primary dehydration zone 45, the temperature of the thin film 28 never exceeds the boiling point of the liquid material at the concentration and pressure encountered during passage through the primary dehydration zone 45.

In its continued passage through the dehydration chamber on the continuous belt 21, the thin film 28 of liquid material is conveyed into a secondary dehydration zone 51 which extends between points marked B and C in FIG. 1. In the secondary dehydration zone 51, the continuous belt 21 is heated by the heating drum 19. The heating drum 19 is heated by steam or other suitable heat transfer fluid which enters heating drum 19 by a conduit 53 and leaves heating drum 19 by a conduit 55. The heat transfer fluid is transferred to a jacket of heating drum 19 by spiders 57. In the secondary dehydration zone 51 a substantial portion of the moisture remaining in the thin film 28 is removed. Since a major portion of the liquid to be removed from the thin film 28 is removed in primary dehydration zone 45, the temperature of the heating drum 19 can be maintained at relatively low levels. In general, suitable dehydration is effected in the secondary dehydration zone 51 when the temperature of the heating drum 19 is maintained within the range of from about 160°F to about 220°F. Preferably, to prevent detrimental overheating of heat sensitive materials being dried, the heating drum 19 is maintained at a temperature of less than about 205°F and preferably within the range of from about 190°F to about 205°F. The thin film 28 generally exits from the secondary dehydration zone 51 with a moisture content of from about 2 to about 5 percent.

After leaving the secondary dehydration zone 51, the thin film 28 on the continuous belt 21 enters a final dehydration zone 59 as represented by points marked C and D in FIG. 1. In the secondary dehydration zone 51 the continuous belt 21 is heated substantially to the temperature of the heating drum 19. Consequently, the continuous belt 21 has a substantial amount of sensible heat which is used as the driving force for final moisture removal in the final dehydration zone 59. A flow of dry air is introduced through conduit 60 to carry off the residual moisture as it is removed in the final dehydration zone 59. The dry air sweeps through the final dehydration zone 59 and exits through vacuum conduit 46. The thin film 28 generally leaves the final dehydration zone 59 at a moisture level in the range of from about 0.5 to about 2.5 percent.

After leaving the final dehydration zone 59, the thin film 28 enters a cooling zone which extends from point D to point E of FIG. 1. The cooling drum 17 is provided with a cooling liquid through a conduit 61. The coolant is distributed to cooling drum 17 through spiders 65 and exits from the cooling drum 17 through a conduit 63. In general, the coolant is supplied to the cooling drum 17 at a rate sufficient to maintain the surface of the cooling drum 17 at a temperature of from about 10°F to about 40°F. It is preferred to reduce the temperature of the thin film 28 in the cooling zone to a temperature within the range of from about 60°F to about 100°F. During cooling of the thin film 28 the continuous belt 21 is also cooled to a temperature equivalent to the temperature of the cooling drum 17 surface.

At point E, the thin film 28 is removed from the continuous belt 21 by means of a doctor blade 69. The dehydrated material removed from the belt 21 by the doctor blade 69 falls into a hopper 71 and is removed through a suitable vacuum lock 73 to a receptacle 75.

The apparatus and method of the present invention are particularly suitable for dehydrating heat sensitive materials. However, the apparatus and method are also suitable for drying non-heat sensitive materials when it is desirable to dehydrate such materials as a thin film. Heat sensitive materials which are suitable for dehydration in the apparatus and according to the method of the present invention include citrus juices, fruit juices, vegetable juices, vegetable purees, and fruit purees. Particularly suitable materials for dehydration are concentrates of the foregoing heat sensitive materials having from about 30 to about 60 percent moisture.

The following detailed description of the operation of the present invention is directed to dehydration of orange juice concentrate. However, it should be understood that the apparatus is equally suitable for drying other heat sensitive liquids and non-heat sensitive liquids as described above.

As an example of the apparatus and method of the present invention, orange juice concentrate is dehydrated in accordance with the invention. A continuous belt 21 which is 25 feet long is mounted on a cooling drum 17 and a heating drum 19 which are spaced 9 feet apart from center to center. The continuous belt 21 and the cooling and heating drums 17 and 19 are located within a housing 11 which is provided with vacuum means. A vacuum of 2 mm Hg is maintained within the housing 11 through the dehydration process.

Orange juice concentrate having a brix of 72 is fed to the continuous belt 21 by means of the feeding apparatus heretofore described. The metering roll 25 is operated at a speed of 1 rpm and the applicator roll 27 is operated at a speed of 1.5 rpm. The continuous belt 21 operates at a speed of 5 feet per minute. Under these conditions, a thin film 28 of concentrated orange juice having a depth of 0.02 inches is applied to the continuous belt 21.

Immediately after application to the continuous belt, the thin film 28 of concentrated orange juice is subjected to radiant heat. A bank of radiant heaters 47 is located above the thin film 28 in the primary dehydration zone 45. A further bank of radiant heaters 49 is mounted beneath the continuous belt 21. The upper bank of radiant heaters 47 has an output of 8 kilowatts. In the primary dehydration zone 45, the orange juice concentrate is dehydrated to a level of 90 brix. The radiant energy applied above and below the continuous belt 21 in the primary dehydration zone 45 is sufficient to evaporate 12 pounds of moisture per hour from the orange juice concentrate which is applied to the continuous belt 21 at a rate of 60 pounds per hour. Accordingly, 48 pounds per hour of 90° brix orange juice concentrate enters the secondary dehydration zone 51 wherein the thin film 28 is heated by heating drum 19. The heating drum 19 is maintained at a temperature of 200°F. During passage over the heating drum 19, the orange juice concentrate is puffed and the cell structure is stabilized. The puffing is sufficient to increase the volume of the thin film 28 by 3 times its original volume. During passage through the secondary dehydration zone 51, 3 pounds of moisture per hour are removed from the orange juice concentrate. The continuous belt 21 leaves the heating drum 19 at a temperature of 200°F.

There is sufficient heat stored in the continuous belt 21 to evaporate another 2 pounds of moisture per hour from the orange juice concentrate. As the thin film 28 of dehydrated orange juice concentrate approaches the cooling drum 17, the belt temperature is about 135°F and the orange juice concentrate has a moisture level of about 1.7 percent by weight. The total moisture dehydrated in the dehydrator is 16 pounds per hour.

12 pounds of the moisture or 80 percent of the total moisture removed from the orange juice concentrate is removed in the primary dehydration zone 45 by radiant energy to the belt 21 before it reaches the heating drum 19. Such primary moisture removal is effected at relatively low temperatures in the range of from about 30°F to 65°F.

During passage over the cooling drum 17, the thin film 28 of dehydrated orange juice concentrate is reduced in temperature to 105°F. The dried orange juice concentrate is then removed from the cooling drum 17 by doctor blade 69. The dried orange juice concentrate in flake form is collected in hopper 71 and is removed through vacuum lock 73 to receptacle 75. During the operation of the dehydrator, a flow of dry air which is at a temperature of 70°F and a relative humidity of 10 percent is admitted through conduit 60 at a rate of 5 pounds per hour.

The present invention provides an improved apparatus for the dehydration of heat sensitive materials. Through the use of an improved feeding system, an accurately controlled thin film of the heat sensitive material is applied to the uppermost surface of a continuous belt. The moisture in the thin film is rapidly removed by radiant heat energy and the thin film is subjected to relatively low temperatures during the dehydration process.

What is claimed is:

1. A method for dehydrating a heat sensitive material which comprises applying a thin film of liquid material having a thickness from 0.005 to 0.05 inch to a supporting surface, by means of an applicator system comprising a metering roll having a lateral surface provided with a plurality of annular grooves and a counter-rotating applicator roll having a smooth lateral surface, subjecting said thin film to vacuum conditions and carefully controlled uniform heating throughout subsequent dehydration, moving said supporting surface and said thin film through a first dehydration zone wherein said thin film is subjected to only sufficient radiant heat to remove from about 50 to about 90 percent by weight of the total moisture from said thin film without damage to the heat sensitive material, moving said supporting surface and said partially dehydrated thin film to a second dehydration zone wherein said thin film is further heated to a temperature in the range of from about 105°F. to about 210°F. to remove additional moisture without damage to the heat sensitive material, and then moving said supporting surface and the almost dry thin film to a third dehydration zone to effect further controlled dehydration of the almost dry thin film without damage to the heat sensitive material.

2. A method for dehydrating liquid materials in accordance with claim 1 wherein said dehydrated heat sensitive material is immediately moved to a cooling zone after leaving said third dehydration zone.

3. A method in accordance with claim 1 wherein the liquid material is orange juice having a moisture content of from about 30 percent to about 60 percent by weight, and including the step of removing about 90 percent by weight of the total moisture from the orange juice in said first dehydration zone.

4. In vacuum dehydrator apparatus including a housing constituting a vacuum chamber having disposed therein a heating drum, a cooling drum spaced from the heating drum, a continuous belt trained over said spaced heating and cooling drums, and applicator means for applying a thin film of heat sensitive liquid material to be dried to the uppermost exterior surface of said continuous belt, said applicator means comprising a metering roll having a grooved lateral surface and an applicator roll having a smooth lateral surface, said metering roll and applicator roll having their lateral surfaces in contiguous relationship with one of said rolls being maintained in contact with the surface of said continuous belt, said roll in contact with the belt being rotatably driven in a direction counter to the direction of travel of said continuous belt at the point of contact, said metering roll having a plurality of V-grooves extending circumferentially around the lateral surface thereof, said metering roll being rotatably driven in a direction counter to the direction of rotation of said applicator roll, and controlled feed means to provide a constant height reservoir of heat sensitive liquid material between said metering roll and said applicator roll.

5. The apparatus of claim 4 in which V-grooves of the metering roll are 3/16 inches deep, and are spaced about 2 inches apart to provide uniform film deposition on said stainless steel belt.

6. In a vacuum dehydration system of the endless belt type which is particularly adapted for the dehydration of liquid citrus materials, an applicator system comprising a metering roll having a lateral surface provided with a plurality of annular grooves, and a counter-rotating applicator roll having a smooth lateral surface which continuously deposits a uniform film of liquid citrus materials of about 0.005 to 0.05 inch in thickness on the endless belt, said belt conveying the film through a series of drying zones to produce a dehydrated citrus material containing no more than about 2.5% moisture.

7. The applicator system of claim 6, in which the annular grooves of the metering roll are generally V-shaped in cross section and have a maximum width and depth of about .19–.23 inches, said annular grooves being spaced apart on center intervals a distance of about .35 to about .45 inches.

8. The applicator system of claim 7, in which the annular grooves are about 3/16 inches (.2 inches) deep, and about 3/16 inches (.2 inches) wide.

9. The method of claim 1, in which the heat sensitive material is citrus material, and is applied to the supporting surface as a uniform film which is from about 0.02 inches to about 0.025 inches in depth at the time of deposit.

\* \* \* \* \*